(12) United States Patent
Pasquero et al.

(10) Patent No.: US 9,223,497 B2
(45) Date of Patent: Dec. 29, 2015

(54) IN-CONTEXT WORD PREDICTION AND WORD CORRECTION

(75) Inventors: Jerome Pasquero, Kitchener (CA); Donald Somerset McKenzie, Waterloo (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 655 days.

(21) Appl. No.: 13/422,197

(22) Filed: Mar. 16, 2012

(65) Prior Publication Data

US 2013/0246329 A1  Sep. 19, 2013

(51) Int. Cl.
| | |
|---|---|
| G06N 7/02 | (2006.01) |
| G06F 3/0488 | (2013.01) |
| G06N 99/00 | (2010.01) |
| G06F 17/27 | (2006.01) |
| G06F 3/023 | (2006.01) |

(52) U.S. Cl.
CPC .......... *G06F 3/04886* (2013.01); *G06F 3/0237* (2013.01); *G06F 17/276* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 5,953,541 | A * | 9/1999 | King et al. | 710/67 |
| 6,008,799 | A | 12/1999 | Van Kleeck | |
| 6,286,064 | B1 * | 9/2001 | King et al. | 710/67 |
| 6,307,548 | B1 * | 10/2001 | Flinchem et al. | 715/811 |
| 6,636,162 | B1 * | 10/2003 | Kushler et al. | 341/28 |
| 6,646,573 | B1 * | 11/2003 | Kushler et al. | 341/28 |
| 6,801,190 | B1 * | 10/2004 | Robinson et al. | 345/173 |
| 7,088,345 | B2 * | 8/2006 | Robinson et al. | 345/173 |
| 7,098,896 | B2 * | 8/2006 | Kushler et al. | 345/168 |
| 7,277,088 | B2 * | 10/2007 | Robinson et al. | 345/173 |
| 7,443,316 | B2 | 10/2008 | Lim | |
| 7,453,439 | B1 * | 11/2008 | Kushler et al. | 345/168 |
| 7,479,949 | B2 * | 1/2009 | Jobs et al. | 345/173 |
| 7,593,605 | B2 * | 9/2009 | King et al. | 382/313 |
| 7,758,264 | B2 * | 7/2010 | Jawerth et al. | 400/489 |
| 7,812,860 | B2 * | 10/2010 | King et al. | 348/210.99 |
| 7,880,730 | B2 * | 2/2011 | Robinson et al. | 345/173 |

(Continued)

FOREIGN PATENT DOCUMENTS

| | | |
|---|---|---|
| EP | 1320023 | 6/2003 |
| WO | 2008/085737 | 7/2008 |

OTHER PUBLICATIONS

Arnab et al., "Effective Phrase Prediction", Proceeding, VLDB '07 Proceedings of the 33rd international conference on Very large data bases, pp. 219-230, 2007.*

(Continued)

*Primary Examiner* — Kakali Chaki
*Assistant Examiner* — Fuming Wu
(74) *Attorney, Agent, or Firm* — Fish & Richardson P.C.

(57) ABSTRACT

Methods and systems for predicting user input on a keyboard. Methods include enabling user input on a display comprising at least three fields. The first field displays an input string that is based on input selections such as keyboard entries. The second field displays a candidate prediction generated based on other input selections, consisting at least in part of a proposed completion to the input selection, and partially based on the input string in the first field. The third field displays another candidate prediction generated based on the input string in the first field as well as the candidate prediction in the second field.

28 Claims, 13 Drawing Sheets

(56) References Cited

U.S. PATENT DOCUMENTS

| | | |
|---|---|---|
| 7,912,700 B2 | 3/2011 | Bower et al. |
| 8,028,230 B2 | 9/2011 | Hong |
| 8,074,172 B2 | 12/2011 | Kocienda et al. |
| 8,232,973 B2 * | 7/2012 | Kocienda et al. ............ 345/173 |
| 2004/0021691 A1 | 2/2004 | Dostie et al. |
| 2004/0140956 A1 * | 7/2004 | Kushler et al. ................ 345/168 |
| 2004/0155869 A1 * | 8/2004 | Robinson et al. ............. 345/168 |
| 2005/0174333 A1 * | 8/2005 | Robinson et al. ............. 345/168 |
| 2006/0029296 A1 * | 2/2006 | King et al. .................... 382/313 |
| 2006/0098899 A1 * | 5/2006 | King et al. .................... 382/305 |
| 2006/0159507 A1 * | 7/2006 | Jawerth et al. ................ 400/472 |
| 2006/0195320 A1 * | 8/2006 | Carpenter .................... 704/243 |
| 2006/0265648 A1 | 11/2006 | Rainisto et al. |
| 2006/0265668 A1 | 11/2006 | Rainisto |
| 2007/0256029 A1 * | 11/2007 | Maxwell ....................... 715/834 |
| 2008/0100579 A1 * | 5/2008 | Robinson et al. ............. 345/168 |
| 2008/0122796 A1 | 5/2008 | Jobs et al. |
| 2008/0182599 A1 | 7/2008 | Rainisto et al. |
| 2008/0285857 A1 * | 11/2008 | Sharan et al. ................. 382/209 |
| 2008/0300853 A1 * | 12/2008 | Xiaoning .......................... 704/2 |
| 2009/0077464 A1 | 3/2009 | Goldsmith et al. |
| 2009/0174667 A1 * | 7/2009 | Kocienda et al. ............. 345/169 |
| 2009/0198691 A1 | 8/2009 | Kraft et al. |
| 2009/0228825 A1 * | 9/2009 | Van Os et al. ................. 715/780 |
| 2010/0161538 A1 | 6/2010 | Kennedy et al. |
| 2010/0183246 A1 * | 7/2010 | King et al. .................... 382/305 |
| 2010/0265181 A1 | 10/2010 | Shore |
| 2011/0006929 A1 * | 1/2011 | Fux et al. ......................... 341/24 |
| 2011/0078563 A1 * | 3/2011 | Archer ........................... 715/261 |
| 2011/0085211 A1 * | 4/2011 | King et al. .................... 358/474 |
| 2011/0090151 A1 | 4/2011 | Huang et al. |
| 2011/0201387 A1 * | 8/2011 | Paek et al. ..................... 455/566 |
| 2012/0254318 A1 * | 10/2012 | Poniatowskl ................. 709/206 |
| 2012/0326984 A1 * | 12/2012 | Ghassabian .................. 345/168 |
| 2013/0125037 A1 * | 5/2013 | Pasquero et al. ............. 715/773 |
| 2013/0246329 A1 * | 9/2013 | Pasquero et al. ................ 706/52 |
| 2013/0271385 A1 * | 10/2013 | Griffin et al. ................. 345/173 |
| 2013/0285926 A1 * | 10/2013 | Griffin et al. ................. 345/173 |
| 2013/0325438 A1 * | 12/2013 | Griffin et al. ..................... 704/9 |
| 2014/0104251 A1 * | 4/2014 | Zhang ........................... 345/205 |

OTHER PUBLICATIONS

Partial European Search Report in corresponding European Patent Application No. EP 12 15 9905, mailed Jul. 25, 2012.

Article 94(3) Communication from the European Patent Office of Application No. 12 159 905.4, mailed Jun. 18, 2014, from the European Patent Office (7 pages).

Extended European Search Report issued in EP Application No. 12159905.4, mailed Nov. 26, 2012, 8 pages.

Replacement Search Report issued in EP Application No. 12159905.4, mailed Dec. 21, 2012, 5 pages.

Canadian Office Action issued in CA Application No. 2,809,653, mailed Sep. 29, 2014, 3 pages.

\* cited by examiner

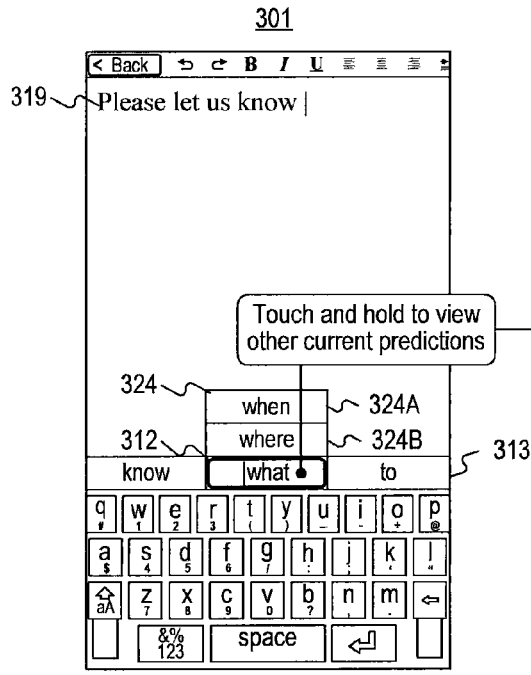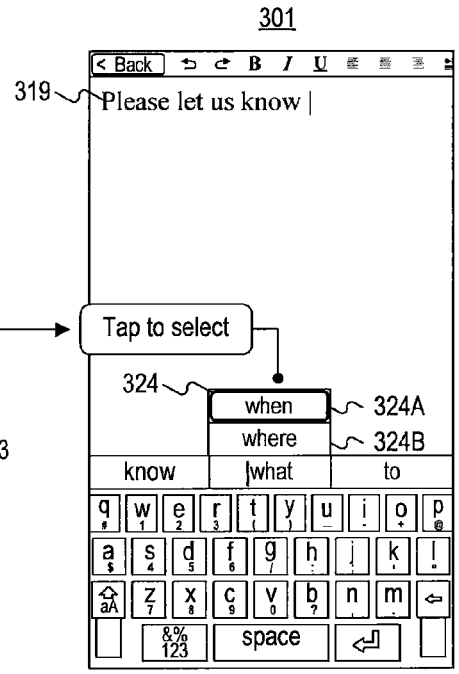
FIG. 3E  FIG. 3F
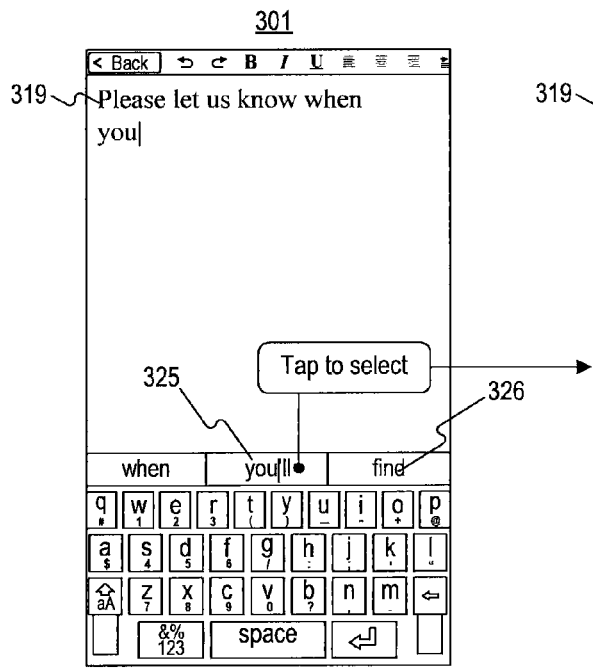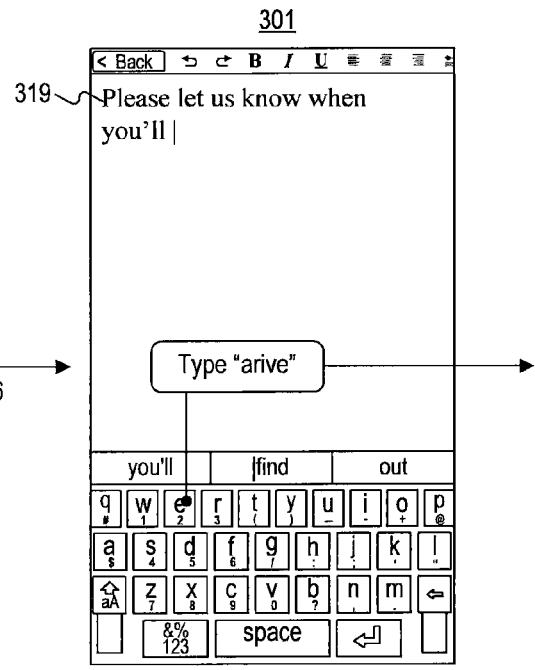
FIG. 3G  FIG. 3H

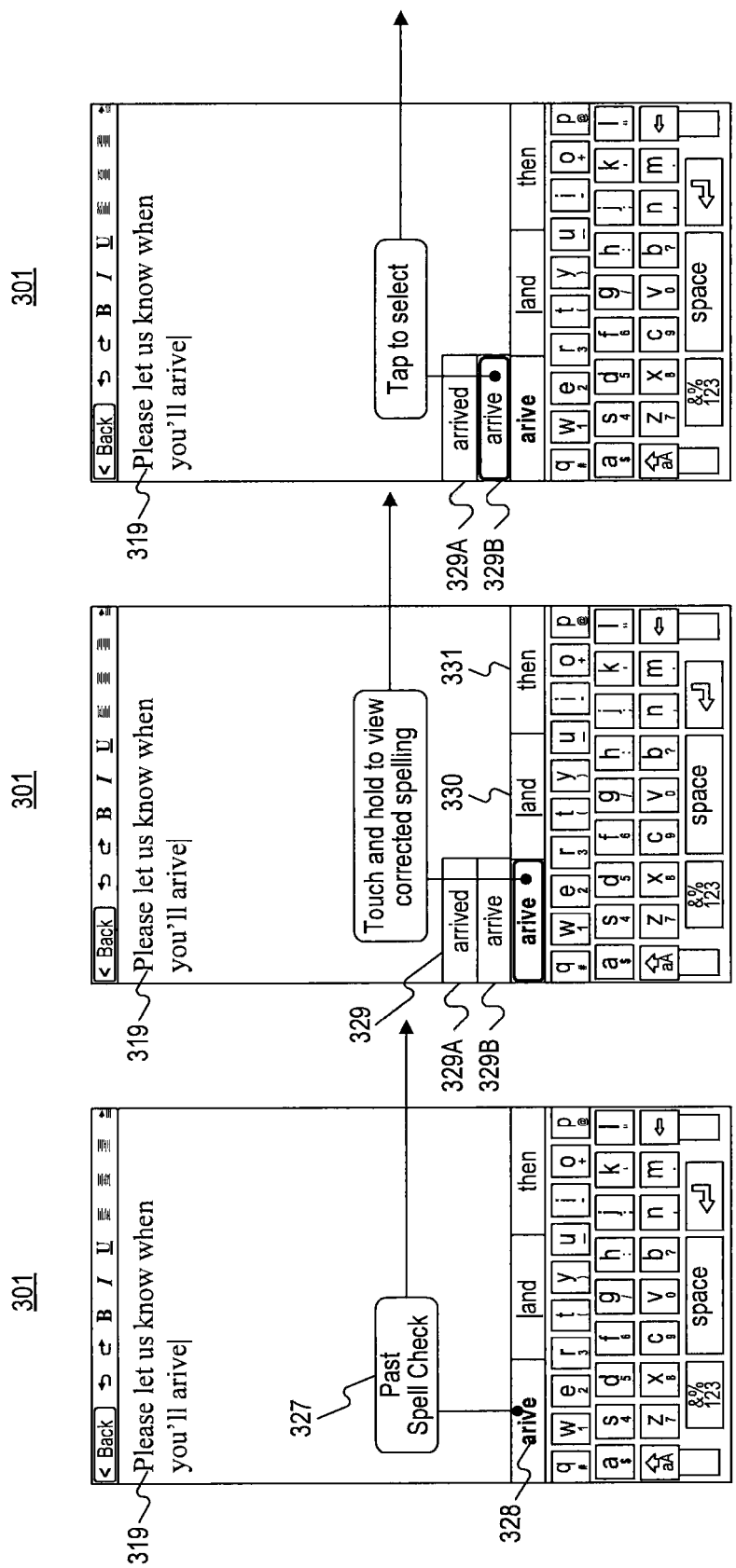

IN-CONTEXT WORD PREDICTION AND WORD CORRECTION

FIELD

Example embodiments disclosed herein relate generally to input methodologies for electronic devices, such as handheld electronic devices, and more particularly, to predictive text input methods for electronic devices.

BACKGROUND

Increasingly, electronic devices, such as computers, netbooks, cellular phones, smart phones, personal digital assistants, tablets, etc., have touchscreens that allow a user to input text characters into an application, such as a word processor or email application. Text input on touchscreens can be a cumbersome task due to, for example, the small touchscreen area. This is particularly frustrating where a user wishes to input a long message. Further, given the small touchscreen area, users have difficulty entering and selecting words.

Thus, a system is needed to intelligently allow a user to more quickly enter text on an electronic device, to yield an improved system.

DESCRIPTION OF EXAMPLE EMBODIMENTS

Figure 1:
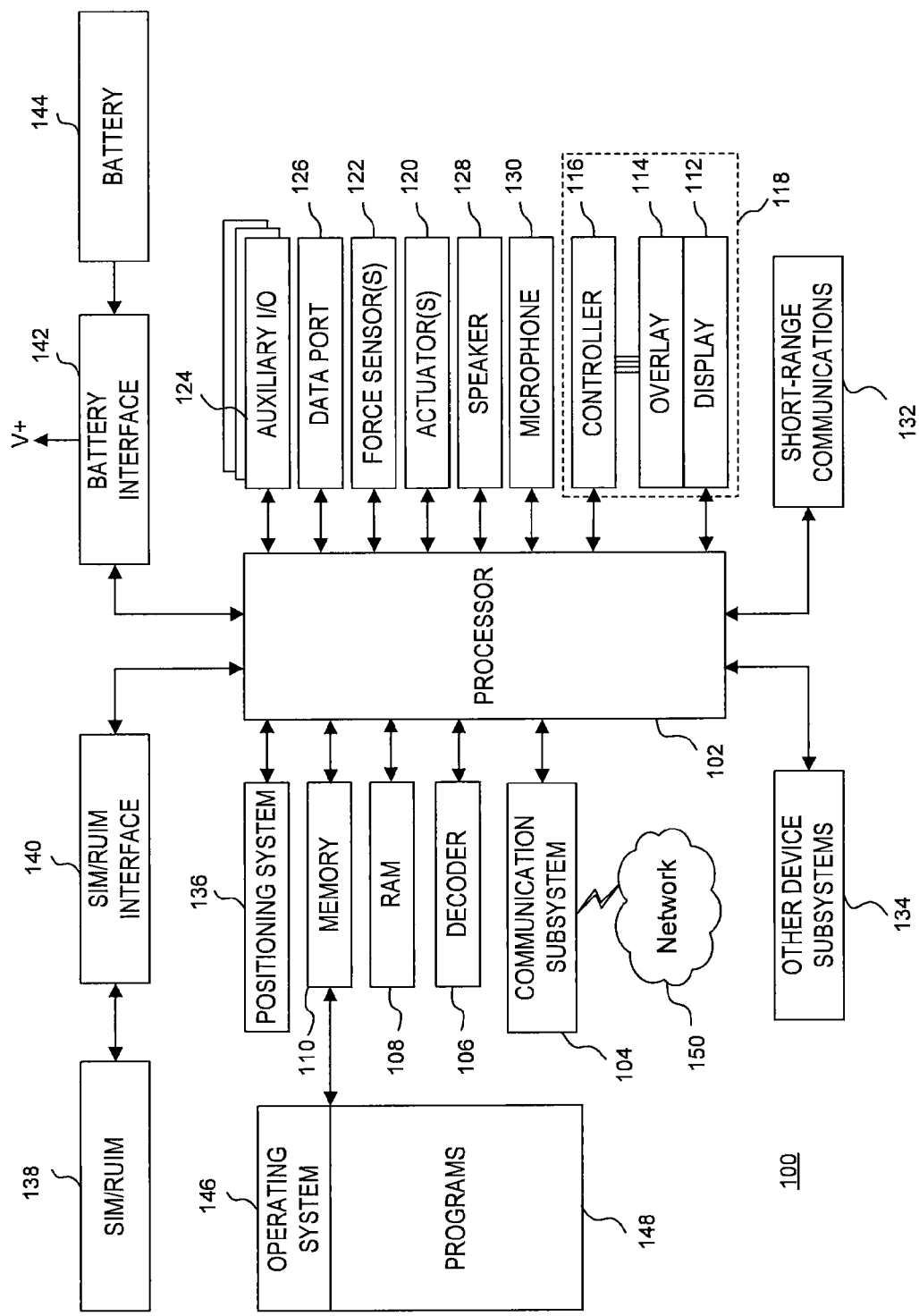
FIG. 1 is an example block diagram of an electronic device, consistent with embodiments disclosed herein.

Reference will now be made in detail to various embodiments, examples of which are illustrated in the accompanying drawings. Wherever possible, the same reference numbers will be used throughout the drawings to refer to the same or like parts.

The present disclosure relates to predictive text inputting processes for electronic devices such as (i) wired communication devices like laptop computers having touchscreens, (ii) wireless communication devices such as cellular phones, smartphones, wireless organizers, personal digital assistants, wirelessly enabled notebook computers, tablets, and similar devices, and (iii) independent electronic devices (without wireless or wired communication capabilities) such as a handheld electronic game device, digital photograph album, or digital camera. In some configurations, according to this disclosure, the electronic device comprises a virtual or physical keyboard or both types of keyboards.

Predictive text input solutions have been introduced for assisting with input on an electronic device. These solutions include predicting which word a user is entering and offering a suggestion for completing the word, and predicting future words that a user enters at a later time. But these solutions can have limitations, often requiring the user to input most or all of the characters in a text unit, such as a word, before the solution suggests the word the user is trying to input. Even then, a user often has to divert visual attention from the keyboard to view and consider the suggested word displayed elsewhere on the display of the electronic device, and thereafter, look back at the keyboard to continue typing. Refocusing of one's eyes relative to the keyboard while inputting information in an electronic device, particularly when composing large texts, can strain the eyes and be cumbersome, distracting, and otherwise inefficient. Moreover, processing cycles are lost and display power is wasted as the processor is idling while the user is focusing attention to the input area to determine what words or characters have been entered, and then back at the keyboard. A further limitation of these solutions is that they are only able to display predictions for the word the user is trying to input. These solutions also do not provide the necessary context for users to understand why a particular prediction has been chosen.

Accordingly, example embodiments described herein enable users of electronic devices to input information without diverting attention from the keyboard and subsequently refocusing, by making predictions about input units, such as words the user is currently entering and words the user is likely to enter at a later point, and allowing the user to select particular predictions or alternate predictions. These predictions are also referred to herein as candidate predictions for text units.

In one embodiment, a method is provided for accepting text input on an electronic device. The method enables user input using a set of fields on a display, and the display can include a first field displaying a first input string based on an input selection such as a user typing at a keyboard. The display further can include a second field displaying a first candidate prediction formed by a set of characters corresponding to input selections, such as a user typing at a keyboard, and a proposed completion; this proposed completion can be generated by a predictive algorithm using at least one of the first input string in the first field or the set of characters corresponding to input selections. The display can further include a third field displaying a second candidate prediction generated by a predictive algorithm using at least one of the first input string in the first field or the first candidate prediction.

In another embodiment, a second method is provided for accepting text input on an electronic device. The method displays a first candidate prediction on a touchscreen of the device; this prediction is based on an input selection (for example, text entry by a user). The method receives an initial touch input on top of the candidate prediction. While continuing to receive the initial touch input, the method receives a moving touch input on the touchscreen of the device and starts a timer. If the method determines that a continuous touch is still occurring on the touchscreen at the end of a period measured by the timer, the method will accept the first candidate prediction. This period measured by the time can be based in part on a distance between the position of the touch and an edge of the touchscreen.

In another embodiment, a device is provided. The device comprises a display and a processor that is configured to perform a method. The method enables user input using a set of fields on a display, and the display can include a first field displaying a first input string based on an input selection such as a user typing at a keyboard. The display further can include a second field displaying a first candidate prediction formed by a set of characters corresponding to input selections, such as a user typing at a keyboard, and a proposed completion; this proposed completion can be generated by a predictive algorithm using at least one of the first input string in the first field or the set of characters corresponding to input selections. The display can further include a third field displaying a second candidate prediction generated by a predictive algorithm using at least one of the first input string in the first field or the first candidate prediction.

In another embodiment, a second device is provided for accepting text input on an electronic device. The device includes a display with a touchscreen and a processor configured to perform a method. The method performed by the processor displays a first candidate prediction on the touchscreen; this prediction is based on an input selection (for example, text entry by a user). The method receives an initial touch input on top of the candidate prediction. While continuing to receive the initial touch input, the method receives a moving touch input on the touchscreen of the device and starts a timer. If the method determines that a continuous touch is still occurring on the touchscreen at the end of a period measured by the timer, the method will accept the first candidate prediction. This period measured by the time can be based in part on a distance between the position of the touch and an edge of the touchscreen.

These example embodiments, as well as those described below, permit the user of an electronic device to input information without diverting visual attention from the keyboard and subsequently refocusing. Predicting and providing various options that the user is likely contemplating, and doing so at appropriate locations on the keyboard, allows a user's focus to remain on the keyboard, which enhances efficiency, accuracy, and speed of character input. Such embodiments allow users to select and confirm multiple words at the same time, thus creating a convenient system for use by its users.

FIG. 1 is a block diagram of a device 100, consistent with example embodiments disclosed herein. Device 100 includes multiple components, such as a processor 102 that controls the overall operation of device 100. Communication functions, including data and voice communications, are performed through a communication subsystem 104. Data received by device 100 is decompressed and decrypted by a decoder 106. Communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Device 100 can be a battery-powered device and include a battery interface 142 for receiving one or more batteries 144.

Processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications subsystem 132; other device subsystems 134; and an input device such as touchscreen 118.

Touchscreen 118 includes a display 112 with a touch-active overlay 114 connected to a controller 116. User interaction with a graphical user interface (GUI), such as a virtual keyboard rendered on display 112, is performed through touch-active overlay 114. Processor 102 interacts with touch-active overlay 114 via controller 116. Input, such as text, symbols, images, and other items are displayed on display 112 of touchscreen 118 via processor 102. For example, text characters are inputted when the user touches the touchscreen at a location associated with said character. In other embodiments, a keyboard enables input to the device using a set of physical keys and communicates with processor 102 via auxiliary I/O subsystem 124.

Touchscreen 118 is connected to and controlled by processor 102. Accordingly, detection of a touch event and determining the location of the touch event can be performed by processor 102 of device 100. A touch event includes, in some embodiments, a "tap" by a finger or stylus (a single touch of short duration on touchscreen 118), a "swipe up" by a finger or stylus (a single touch of short duration on touchscreen 118 followed by a motion in an upwards duration, while still maintaining contact with touchscreen 118), a "flick up" by a finger (similar to the swipe up, but with a more rapid motion upward), a "swipe to right" by a finger (similar to the swipe up, but in a different direction), a long press by finger or stylus, a press by a finger or stylus for a predetermined period of time, and the like. Each of these touch events initiates operations by the processor.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen, or a frustrated total internal reflection touchscreen. The type of touchscreen technology used in any given embodiment will depend on the electronic device and its particular application and demands.

Processor 102 can also interact with a positioning system 136 for determining the location of device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Device 100 also includes an operating system 146 and programs 148 that are executed by processor 102 and are typically stored in memory 110. In some embodiments, additional applications are loaded onto device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to processor 102. Processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of device 100 is similar. Speaker 128 outputs audible information converted from electrical signals, and microphone 130 converts audible information into electrical signals for processing.

Figure 2:
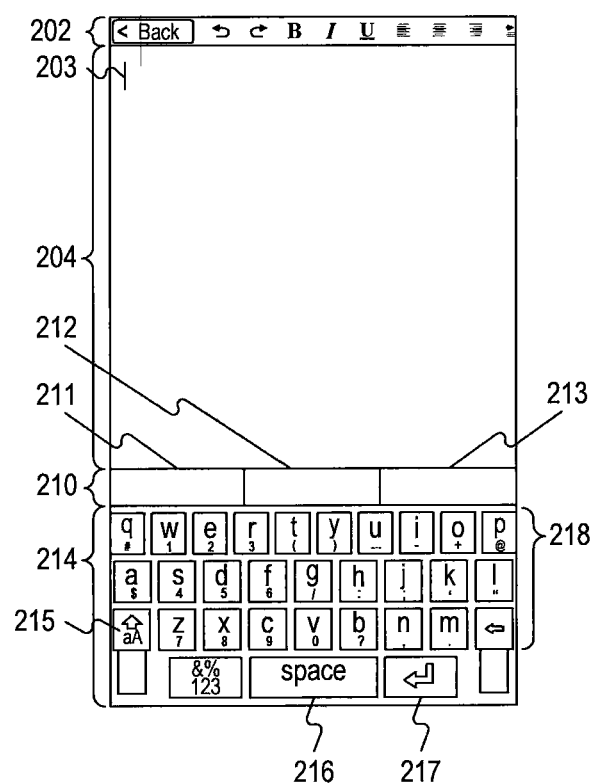
FIG. 2 is an example diagram of a touchscreen as disposed in an electronic device, consistent with embodiments described herein.

FIG. 2 discloses an embodiment of touchscreen 201. Touchscreen 201 displays a formatting bar 202 for performing operations such as undo, redo, and modifying text to be bolded, italicized, underlined, left-aligned, center-aligned, or right-aligned. In some embodiments formatting bar 202 has additional or different functionality; the above examples are not limiting. Touchscreen 201 further displays a cursor 203 to indicate where input entered by the user will be displayed on the screen. Touchscreen 201 further displays a textbox 204 that contains cursor 203 and input entered or accepted by the user.

In this example, touchscreen 201 also contains a preliminary input area, such as horizontal bar 210. In some embodiments, horizontal bar 210 is divided up into at least three regions—a leftmost segment 211, a center segment 212, and a rightmost segment 213. In some embodiments, each segment contains input entered by the user, input generated by processor 102, or a combination of both. In some embodiments, touchscreen 201 also contains keyboard 214, which contains at least one shift key 215, at least one spacebar 216, at least one enter/carriage return key 217, and a set of character keys 218.

Figure 3A:
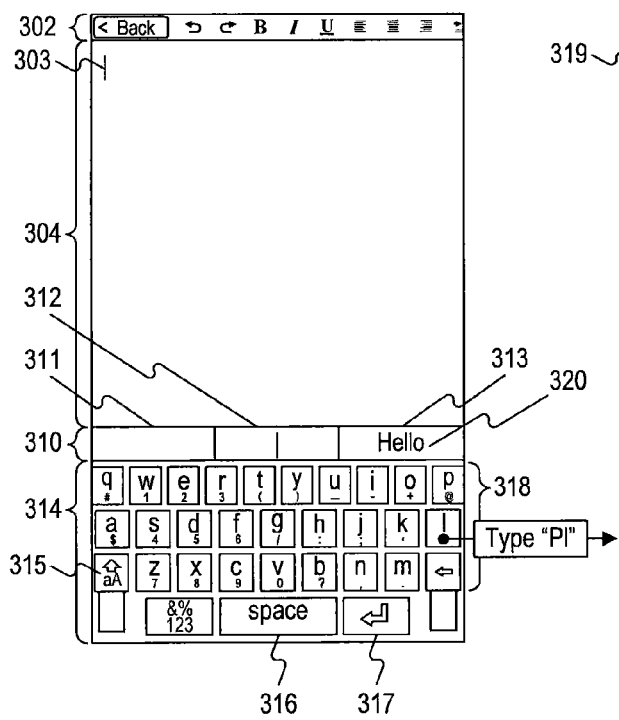
FIGS. 3A-3N show example screens of a touchscreen display, used to explain methods for accepting input from a user, consistent with embodiments disclosed herein.
Figure 3B:
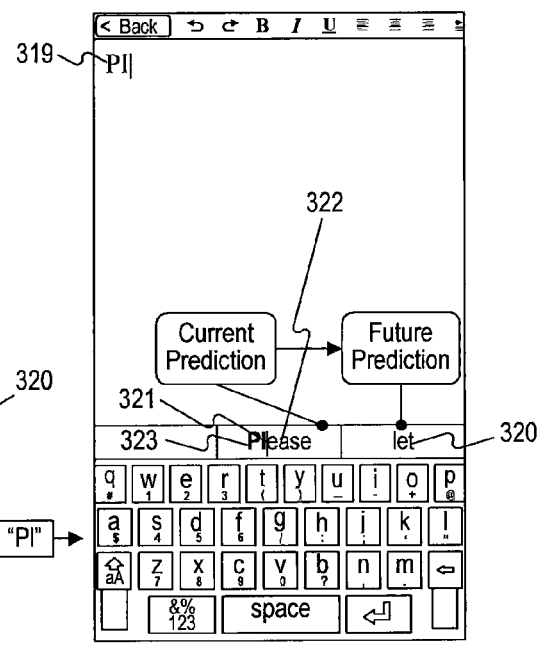
Figure 3C:
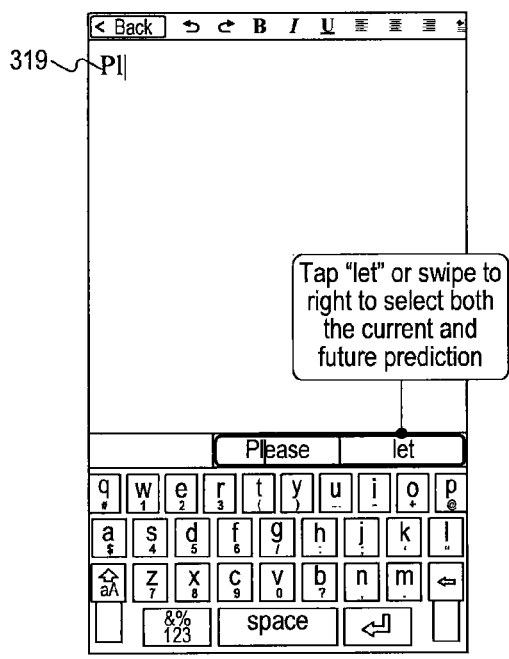
Figure 3D:
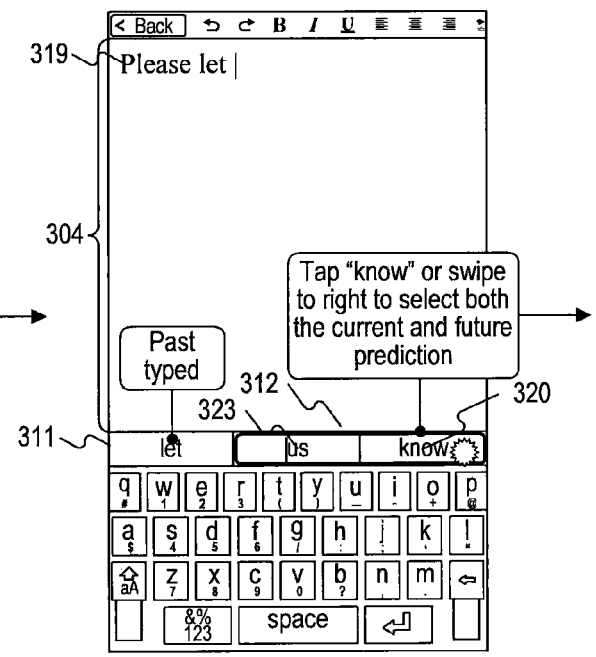
Figures 3L, 3M, 3N:
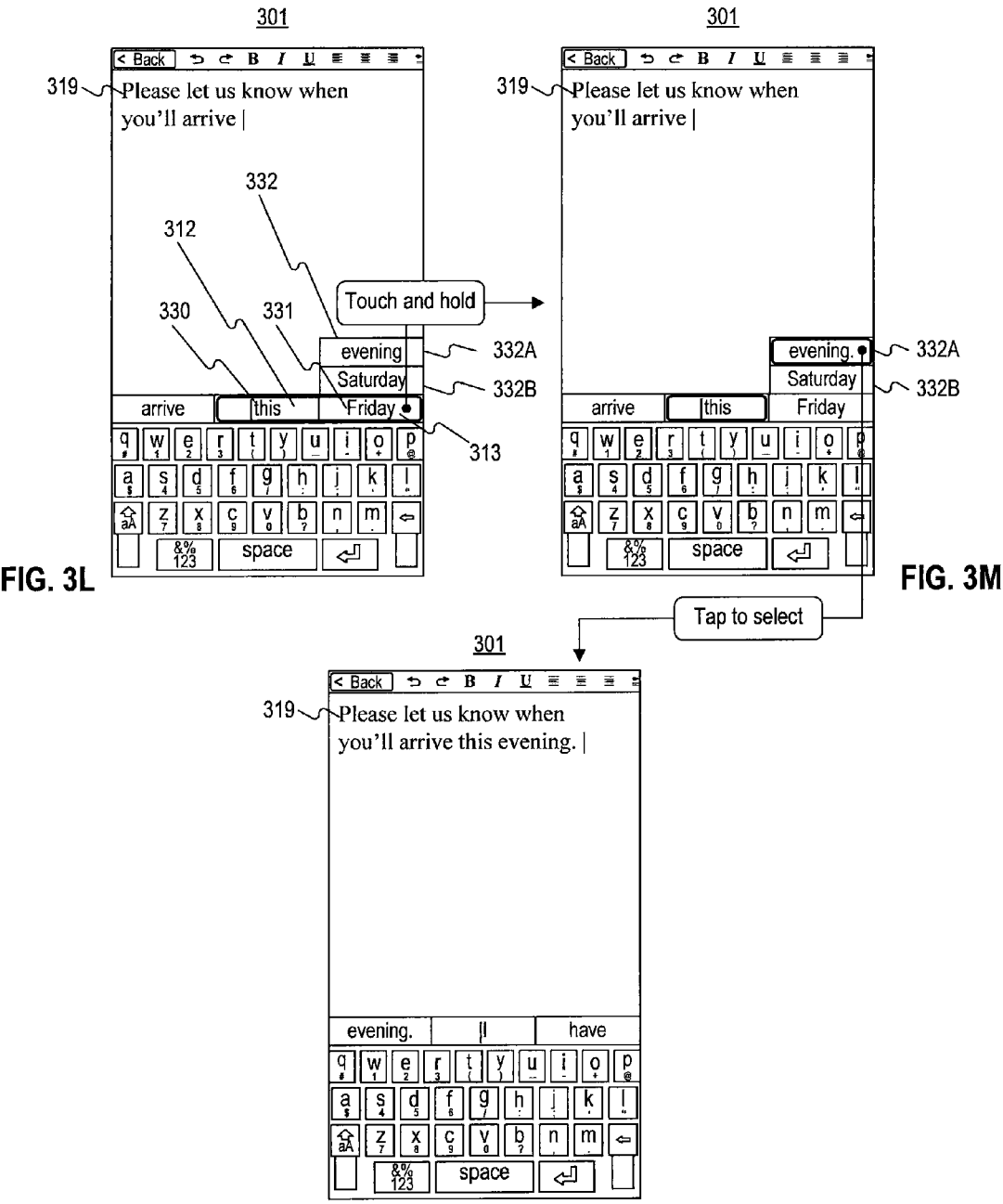

FIGS. 3A-3N are examples of displays used to explain methods for accepting input by a user in accordance with disclosed implementations. FIG. 3A discloses a display on touchscreen 301, as described with respect to FIG. 2. When no input such as characters or text have been entered by the user, the leftmost and center segments 311 and 312 of horizontal bar 310 do not display any text. Rightmost segment 313 initially displays a "starter" text 320, "Hello," as shown in FIG. 3A.

As shown in the FIG. 3B, when the user begins to enter characters, for example, the characters "P" and "l," the characters appear both as entered text 319 in textbox 304 and as a partial entry 321 in center segment 312. An algorithm is used to add a partial complete prediction 322, i.e. the character string "ease," to create current prediction 323, i.e., the word "please." A future prediction 320 is further generated based on current prediction 323. First, the device accepts an entry of "P" from the user, and modifies current prediction 323 and future prediction 320, based on the predictions that are generated based on the entry of the letter "P." (This step is not shown in FIG. 3B.) Then, the device accepts an entry of "l" from the user, and again modifies current prediction 323 and future prediction 320 based on the predictions that are generated from the partial word "Pl." This yields "Please" as current prediction 323 and "let" as future prediction 320. In some embodiments, multiple predictions are generated for each of the center and rightmost segments, but only the most likely prediction for each segment is displayed to the user, to be explained later in greater detail.

FIG. 3C discloses a further display on touchscreen 301. As shown in FIG. 3B, the user has entered "Pl" and the auto-completion algorithm completed the current prediction 323 with "ease" to generate "please," and further generated "let" as the most likely future prediction 320. FIG. 3C discloses touchscreen 301 can then receive a user input such as a "tap" or a "swipe to right" motion (as mentioned above) to confirm, that is, to accept, current prediction 323 and future prediction 320 as text input.

In some embodiments, when the user performs one of these motions starting on future prediction 320, both current prediction 323 and future prediction 320 are confirmed by the system. Once current prediction 323 and future prediction 320 are confirmed, as shown in FIG. 3D, the portion of current prediction 323 that is not already displayed in textbox 304 is displayed in textbox 304 to complete input text 319 as "Please." Future prediction 320 ("let") in FIG. 3C is also added and displayed in textbox 304. Future prediction 320 ("let") in FIG. 3C in rightmost segment 313 is then moved to leftmost segment 311. New predictions can then be generated for current prediction 323 ("us") and future prediction 320 ("know"), and then displayed in center segment 312 and rightmost segment 313, respectively, as shown in FIG. 3D.

FIG. 3E discloses a further display of touchscreen 301, showing operations when a user touches and holds down on a word in center segment 312. In some embodiments, the operations in FIG. 3E can occur when the user touches and drags in an upwards direction. A popup 324 is displayed to allow the user to select from a list of alternate predictions 324A and 324B. In some embodiments, these predictions are the predictions that were initially generated for the word in question but were not as likely, that is, not ranked as highly, as the most likely prediction. The number of alternate predictions shown can vary based on the algorithm used for auto-completion as well as a user-defined preference which enables upper and lower bounds on the number of displayed alternate predictions.

FIG. 3F shows operations when the user taps on or, in embodiments where the user has touched and dragged in an upwards direction, released the touch on, one of alternate predictions 324A. In FIG. 3G, it can be seen that once the user taps to select alternate prediction 324A in FIG. 3F, and types "you," an updated current prediction 325 ("you'll") is displayed in center segment 312 and an updated future prediction 326 ("find") is displayed in rightmost segment 313, based on the selection of alternate prediction 324A ("when").

Once the user types the misspelled word "arive," as can be seen in FIG. 3H, the user can indicate completion of that word, by, for example, pressing the spacebar, pressing the Enter key, pressing a key corresponding to signify the end of the word (for example but not limited to: a comma, a period, a hyphen, an at-sign (@), an exclamation point or mark, a semicolon), or swiping across the screen to the right.

As shown in FIG. 3I, a spell check 327 can be performed on the misspelled word 328. In some embodiments, if the word is misspelled, touchscreen 301 can highlight the word to signify that it is misspelled. For example, this highlighting can be made by coloring the text (for example, with the color red), coloring the segment containing the text, or the like. When a user touches and holds down on the misspelled word 328 as in FIG. 3J, a popup 329 is displayed to allow the user to select from a list of alternate predictions 329A and 329B. In some embodiments, these predictions are generated for the word in question based on words as contained in a dictionary or list of properly spelled words, words contained in a list of commonly misspelled words, and the like. The number of alternate predictions shown can vary based on the algorithm used to complete the words or by a user-selected preference. FIG. 3K shows that the user has tapped an alternate prediction 329B.

In FIG. 3L, it can be seen that as a result of the user tapping an alternate prediction 329B in FIG. 3K, both current prediction 330, displayed as "and" in center segment 312 of FIG. 3K, and future prediction 331, displayed as "then" in rightmost segment 313 of FIG. 3K are updated respectively to "this" and "Friday" based on the selection of the alternate prediction 329B. FIG. 3L shows that when a user touches and holds down on a word in rightmost segment 313, a popup 332 is displayed to allow the user to select from a list of alternate predictions 332A and 332B. In some embodiments, these predictions are the predictions that were previously generated for the rightmost segment but were not as likely as the most likely prediction. The number of alternate predictions shown can vary based on the algorithm used for autocompletion as well as a user-selected preference.

FIG. 3M shows that the user has tapped alternate prediction 332A. In FIG. 3N, it can be seen that as a result of the user tapping alternate prediction 332A, both current prediction 330 in center segment 312 and alternate prediction 332A, as shown in FIGS. 3L and 3M, are accepted as text input by processor 102 and displayed in text box 304. In some embodiments, processor 102 can determine that tapped prediction 332A will end the sentence and thus can add a period to the end of alternate prediction 332A. Processor 102 can also determine that other punctuation or symbols (such as the at-sign (@), comma, hyphen, exclamation point or mark, semicolon, colon, and the like) can end or begin a prediction.

Figure 4A:
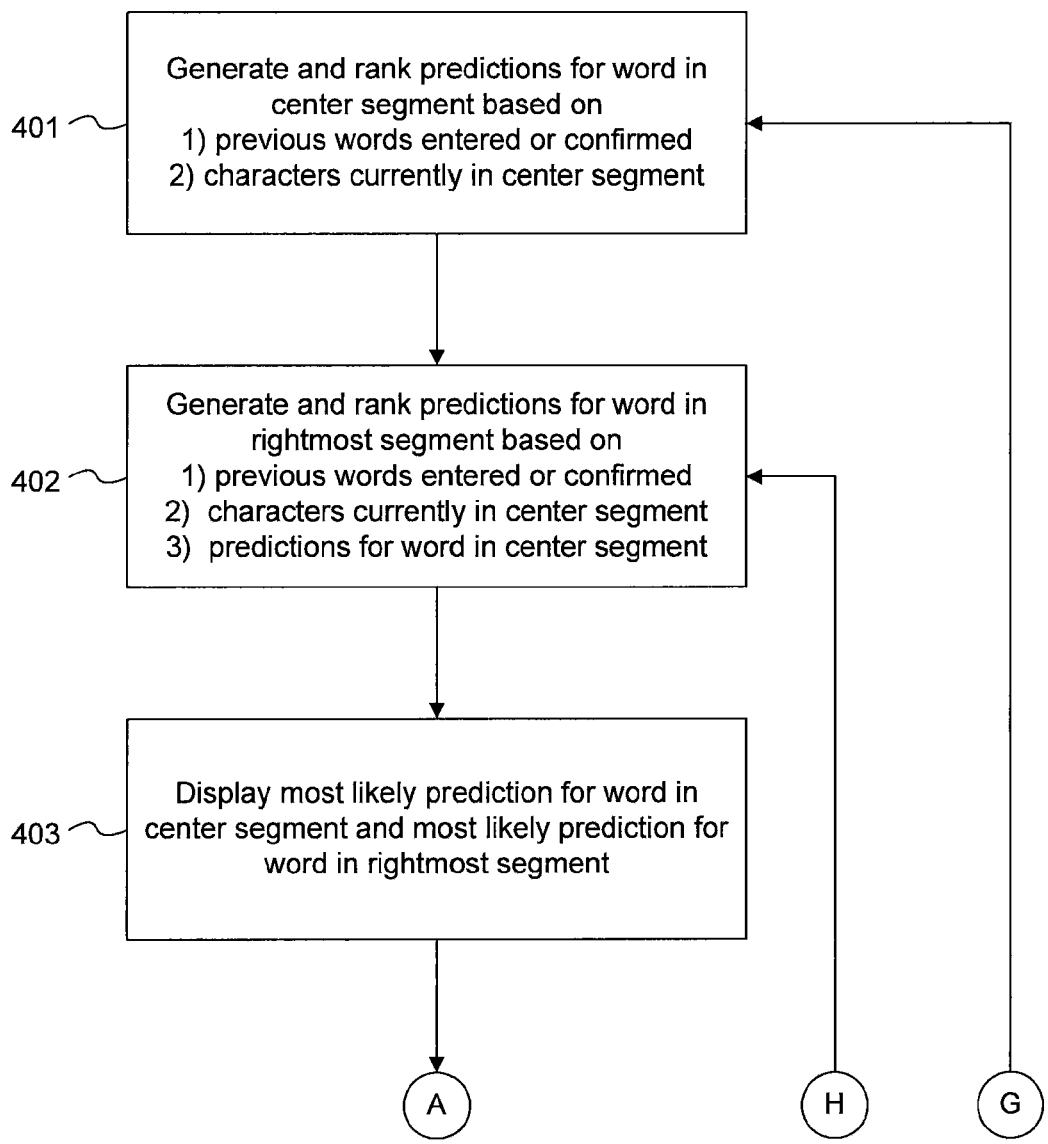
FIG. 4A is a flowchart illustrating an example portion of a method, consistent with embodiments disclosed herein.

FIG. 4A is a flowchart illustrating an example method 400 for entering text input using predictions generated by user input, consistent with example embodiments disclosed herein. In this method, as the user enters various characters on keyboard 214, predicted words will be displayed on center segment 212, in accordance with associated rankings of predictions.

Method 400 begins at block 401, where processor 102 generates and ranks predictions for a word being entered, and displays a prediction in the center segment 212 (FIG. 2) based on an autocompletion algorithm. An example of an autocompletion algorithm is the SwiftKey algorithm released by TouchType, Ltd. This prediction generation step is based on previous words that a user has entered, previous words that a user has confirmed, previous words that a user has entered and confirmed, and characters that are currently displayed in the center segment but do not yet necessarily form a complete word.

Method 400 then proceeds to block 402, where processor 102 generates and ranks predictions for a text unit to be displayed in rightmost segment 213 (FIG. 2). In some embodiments, this prediction generation step is based on words previously entered by a user, words previously confirmed by a user, words that a user has previously entered and confirmed, characters that are currently displayed in the center segment, words that are displayed in the center segment, and predictions that have been generated for the word in the center segment.

Although embodiments disclosed herein illustrate words as text units, other types of text units can also be predicted, such as telephone numbers, acronyms, email addresses, etc.

In some embodiments, the predictions used in blocks 401 and 402 could be calculated using an autocompletion algorithm and contextual data. As used herein, an autocompletion algorithm (such as a predictive algorithm, program, or firmware) includes a set of instructions that when executed by a processor (for example, processor 102), can be used to disambiguate, for example, received ambiguous text input. The autocompletion algorithm can provide various options, such as, for example, words, characters, phrases, acronyms, names, slang, colloquialisms, abbreviations, or any combination thereof, that a user might be contemplating. An autocompletion algorithm can also receive otherwise unambiguous text input and predict characters potentially contemplated by the user based on several factors, such as context, frequency of use, and others, as appreciated by those skilled in the field. An autocompletion algorithm can also receive as input only words which were previously entered by either a user or a device, and return words which are likely to follow those words.

Contextual data can be used in predicting the characters or text units intended by a user. In some embodiments, the electronic device is configured to rank nouns or adjectives higher based on the previous inputted characters or words. If the inputted characters and words are suggestive of a noun or adjective, for example, processor 102, using the contextual data, can rank nouns or adjectives corresponding to what the user is typing higher. In an additional embodiment, a set of characters including adjective suffixes (such as "-ish" or "-ful"), phrases, plurals, or combinations thereof can also be generated and ranked. Contextual data can increase the likelihood that the higher ranked generated set of characters is the set of characters actually intended by a user. In some embodiments, contextual data can include information about which programs or applications are currently executing on processor 102. For example, if an email application is being executed, then a set of characters associated with that user's email system, such as a set of characters representing entries from the user's contact list, can be placed higher in rank. N-grams, including unigrams, bigrams, trigrams, and the like, can be also used in the ranking of the sets of characters. Alternatively, geolocation of the electronic device or user can be used in the ranking process. If, for example, the electronic device recognizes that a user is located at his/her office, then sets of characters and words generally associated with work can be ranked higher. If, on the other hand, the device determines a user is at the beach, then sets of characters and words generally associated with the beach can be ranked higher.

Contextual data can also include information about, for example, words entered previously by the user, common words, words that would complete a known phrase, grammatical attributes of the set of confirmed/entered words (e.g. whether a noun, verb, adverb, or adjective should follow the current words or previous words), or the location of keys on the keyboard (for example, in order to determine likely corrections for potentially misspelled words), or any combination thereof. Contextual data can also include information about, for example, set of characters previously inputted by the user, grammatical attributes of the characters inputted in the input field (for example, whether a noun or a verb is needed as the next set of characters in a sentence), or any combination thereof. The rankings are used generated based on the likelihood of a particular prediction continuing or completing the phrase, sentence, or word that the user is entering using the keyboard. For example, if a user has typed "The quick brown fox jumped over the lazy," processor 102 can determine the ranking for "dog" to be higher than "cat." As another example, if a user has typed "anti," processor 102 can determine the ranking for "trust"—thus completing the word to be "antitrust"—to be higher than the ranking for "diluvian," depending upon contextual data. As another example, if a user has typed "unbelievale," processor 102 can determine the ranking for "unbelievable" to be higher than any other possibility, at least in part because of the possibility that the user did not press the "b" key hard enough. Using the contextual data, processor 102 can also determine whether an inputted character was incorrect. For example, processor 102 can determine that the inputted character was supposed to be an "o" instead of a "p", given the proximity of these characters on a QWERTY keyboard.

In some embodiments, the rankings used in blocks 401 and 402 are used to choose between multiple predictions, each of which comprises the same number of letters. For example, if the set of characters "cellphones" is ranked first in a list generated at block 402 after the letter "cel" is inputted, "cellphones" could be displayed in the center segment. Although "cellophane" contains the same number of characters and is also one possible completion of "cel," the fact that the ranking of "cellphones" is higher than the ranking of "cellophane" would mean that "cellphones" would be the first displayed word in the center segment.

The method then proceeds to a displaying block 403, where processor 102 displays the most likely prediction, that is, the prediction with the highest ranking, for the word in the center segment, and displays the most likely prediction for the word in the rightmost segment.

In some embodiments, candidate predictions can be generated by a probabilistic model. Models such as these will predict users' entries based on past entries by the user. A probabilistic model in this situation can utilize a database populated with word and n-gram frequencies. The data in this database can be used, at least initially, to "seed," or provide initial data, for the predictions. This data can be used when, for example, not enough text has been entered by a user of the device.

In some embodiments, the system will optionally store up to a certain number of predictions in memory for use by the user. In such embodiments, a user will be able to select from among these predictions if the user does not wish to use the most likely prediction to complete his entry.

Figure 4B:
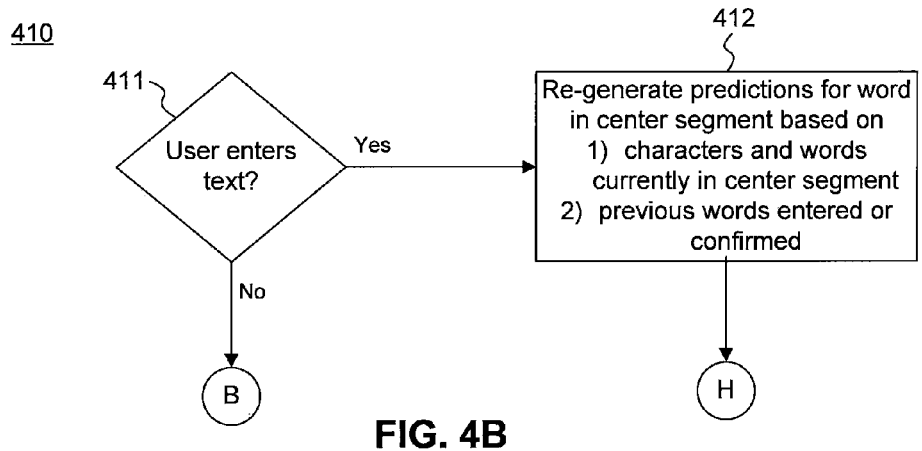
FIG. 4B is a flowchart illustrating an example portion of a method, consistent with embodiments disclosed herein.

The method 400 then continues in FIG. 4B at method 410. In block 411, processor 102 determines if the user has entered any characters. If so, processor 102, in some embodiments, can then generate and rank new predictions that are at least partially based on previous words that a user has entered, previous words that a user has confirmed, previous words that a user has entered and confirmed, characters that the user just entered and are currently in the center segment, words that are present in the center segment, and predictions that have been generated for the word in the center segment. Processor 102 can then continue back to block 402 in FIG. 4A, where processor 102 can generate and rank new predictions for the word in the rightmost block in the manner described as above.

Figure 4C:
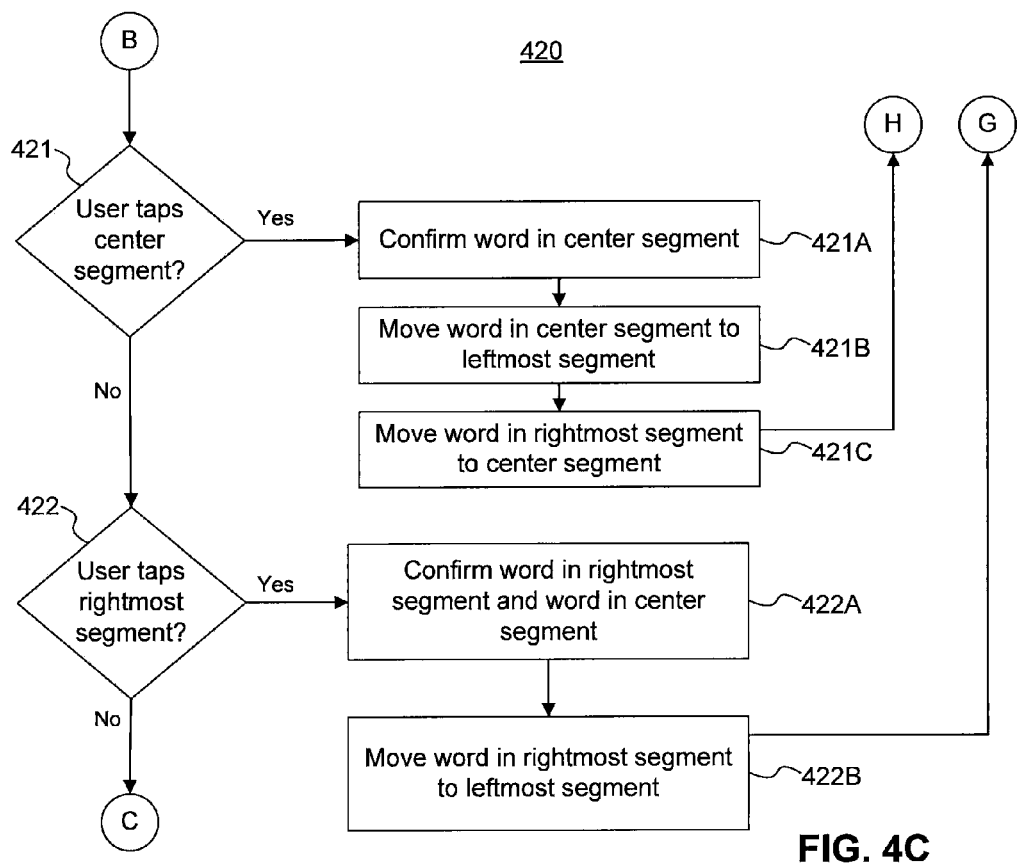
FIG. 4C is a flowchart illustrating an example portion of a method, consistent with embodiments disclosed herein.

If, however, the user is not currently entering new text, processor 102 can continue in FIG. 4C at method 420. In block 421, processor 102 determines if the user has tapped the center segment, thus indicating the user's confirmation of the prediction in the center segment. As mentioned above, the motion of "tapping," "swiping," or "flicking" on a segment can occur using a finger, stylus, or any other item, system, or method for indicating a particular point or region on a touchscreen device.

If the user has tapped the center segment, processor 102 can then take a number of steps to confirm the words in the center segment. First, processor 102 can confirm the prediction in the center segment, block 421A. Next, processor 102 can move the confirmed prediction in the center segment to the leftmost segment, block 421B, thus signifying that the confirmed prediction is part of the "past" words to be used in generating and ranking new predictions, as set forth above. Next, processor 102 can move the unconfirmed prediction in the rightmost segment to the center segment, block 421C. This last movement does not necessarily confirm the word in the center segment, because the user has not yet tapped the word. However, it will queue up the word into the center segment, giving the user the opportunity to confirm or modify the prediction as he chooses. After this step, because the word now in the center segment will have been generated based on the confirmed word now present in the leftmost segment, predictions for the word in the center segment will not need to be re-generated and ranked. Processor 102 can thus continue to block 402 in FIG. 4A, in order to generate and rank predictions for the word in the rightmost segment alone. However, in some embodiments, processor 102 continues instead to block 401 in FIG. 4A, in order to generate and rank predictions for the word in the center segment, before generating and ranking predictions for the word in the rightmost segment If the user has not tapped the center segment, then in block 422, processor 102 determines if the user has tapped the rightmost segment, thus indicating the user's confirmation of the predictions in the rightmost segment and the center segment. As mentioned above, the motion of "tapping" on a segment can occur using a finger, stylus, or any other item, system, or method for indicating a particular point or region on a touchscreen device.

If the user has tapped the rightmost segment, processor 102 can then take a number of steps to confirm the words in the center and rightmost segments. First, processor 102 can confirm the prediction in the rightmost segment, block 422A. Next, processor 102 can confirm the prediction in the center segment, block 422A. Processor 102 confirms the prediction in the center segment because the user is confirming the prediction in the rightmost segment, which has been generated using the prediction present in the center segment. Next, processor 102 can move the confirmed prediction in the rightmost segment to the leftmost segment, block 422B, thus signifying that the confirmed predictions that were originally in the rightmost segment and the center segment are part of the "past" words to be used in generating and ranking new predictions, as set forth above. Processor 102 then continues to block 401 in FIG. 4A, in order to generate and rank new predictions for the word in the center segment before generating and ranking predictions for the word in the rightmost segment.

Figure 4D:
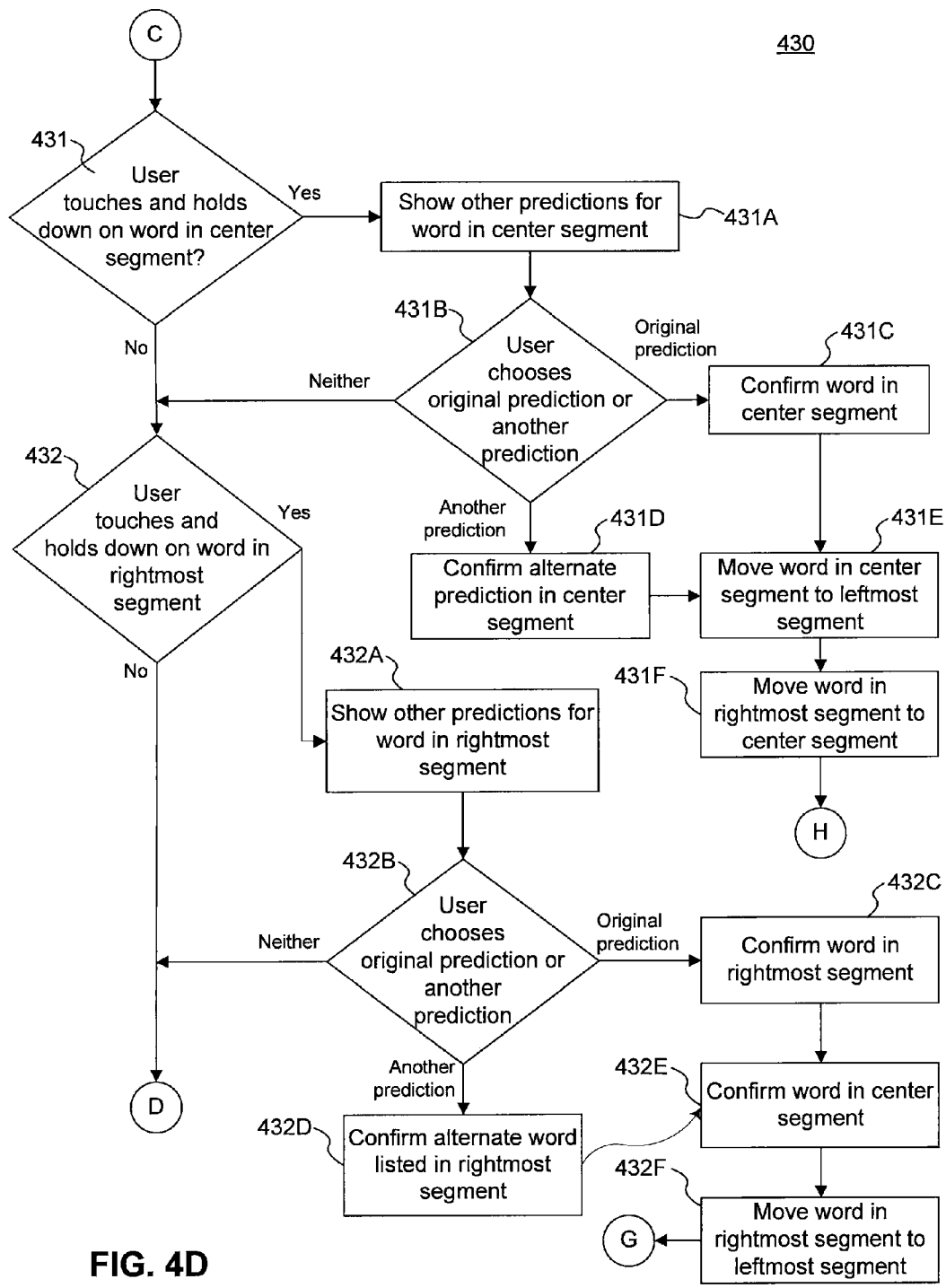
FIG. 4D is a flowchart illustrating an example portion of a method, consistent with embodiments disclosed herein.

If, however, the user has not tapped on the center segment or the rightmost segment (following the "No" direction from block 422), processor 102 can continue in FIG. 4D at method 430. In block 431, processor 102 can determine whether the user has touched and held down on the center segment. In some embodiments, processor 102 can determine whether a user has performed a touch-and-drag motion on the center segment. As mentioned above, the event of touching and holding on the center segment can occur using a finger, stylus, etc. If the user has touched and held down on the center segment, processor 102 can then take a number of steps to assist the user in confirming a word in the center segment. First, processor 102 can display above the center segment a number of the predictions that have been generated and ranked for the center segment, block 431A. In some embodiments, the number of predictions listed will be limited to a specific upper bound, for example, three. However, in other embodiments, the number of predictions displayed to the user will only be limited by the number of predictions generated for the center segment. The user can then select a word, for example, by tapping a word, block 431B. In embodiments where a user has employed a touch-and-drag motion on the center segment, the user can select a word by releasing his touch while still touching the word. If the user selects a current prediction, block 431C, processor 102 confirms the word presently in the center segment.

If, on the other hand, the user selects another prediction, for example one from a list of predictions displayed above the center segment, then processor 102 can confirm the selected prediction as the word in the center segment, as in block 431D. Whether the user confirms the prediction currently displayed in the center segment, or another prediction, processor 102 can then proceed to block 431E, where the now-confirmed word in the center segment can be moved to the leftmost segment. Next, processor 102 can move the unconfirmed prediction in the rightmost segment to the center segment, block 431F. This last movement does not necessarily confirm the word now displayed in the center segment because the user has not tapped the word. However, it will place the word into the center segment, giving the user the opportunity to confirm or modify the prediction as he chooses.

After this step, because the word now in the center segment will have been generated based on the confirmed word now present in the leftmost segment, predictions for the word in the center segment will not need to be re-generated and ranked. Processor 102 thus continues to block 402 in FIG. 4A, in order to generate and rank predictions for the word in the rightmost segment alone. However, in some embodiments, processor 102 would continue instead to block 401 in FIG. 4A, in order to generate and rank predictions for the word in the center segment, before generating and ranking predictions for the word in the rightmost segment.

If the user has not touched and held down on the center segment, or has touched and held down on the center segment but did not select a prediction, then in block 432, processor 102 determines if the user has touched and held down on the rightmost segment. In some embodiments, processor 102 can determine whether a user has performed a touch-and-drag motion on the rightmost segment. As mentioned above, the event of touching and holding on the center segment can occur using a finger, stylus, or any other item, system, or method for indicating a particular point or region on a touchscreen device.

If the user has touched and held down on the rightmost segment, processor 102 can then take a number of steps to assist the user in confirming the words in the center segment and the rightmost segment. First, processor 102 can display a number of the predictions above the rightmost segment that have been generated and ranked for the rightmost segment, as in block 432A. In some embodiments, the number of predictions listed will be limited to a specific upper bound, for example, three. However, in some embodiments, the number of predictions displayed to the user will only be limited by the number of predictions generated for the center segment. The user then selects a word, block 432B, by, for example, tapping the word. In embodiments where a user has employed a touch-and-drag motion on the center segment, the user can select a word by releasing his touch while still touching the word. If the user selects a current prediction, block 432C, processor 102 can confirm the word presently in the rightmost segment.

If, on the other hand, the user selects another prediction, for example one from a list of predictions displayed above the rightmost segment, then processor 102 can confirm the another prediction as the word in the rightmost segment, block 432D. Whether the user chooses the current prediction for the rightmost segment or another prediction for the rightmost segment, processor 102 can then proceed to block 432E, where the word in the center segment is also confirmed. Next, processor 102 can move the confirmed prediction in the rightmost segment to the leftmost segment, block 432F.

After this step, processor 102 thus continues to block 401 in FIG. 4A, in order to generate and rank predictions for the word in the center segment, before generating and ranking predictions for the word in the rightmost segment as in block 402 of FIG. 4A.

Figure 4E:
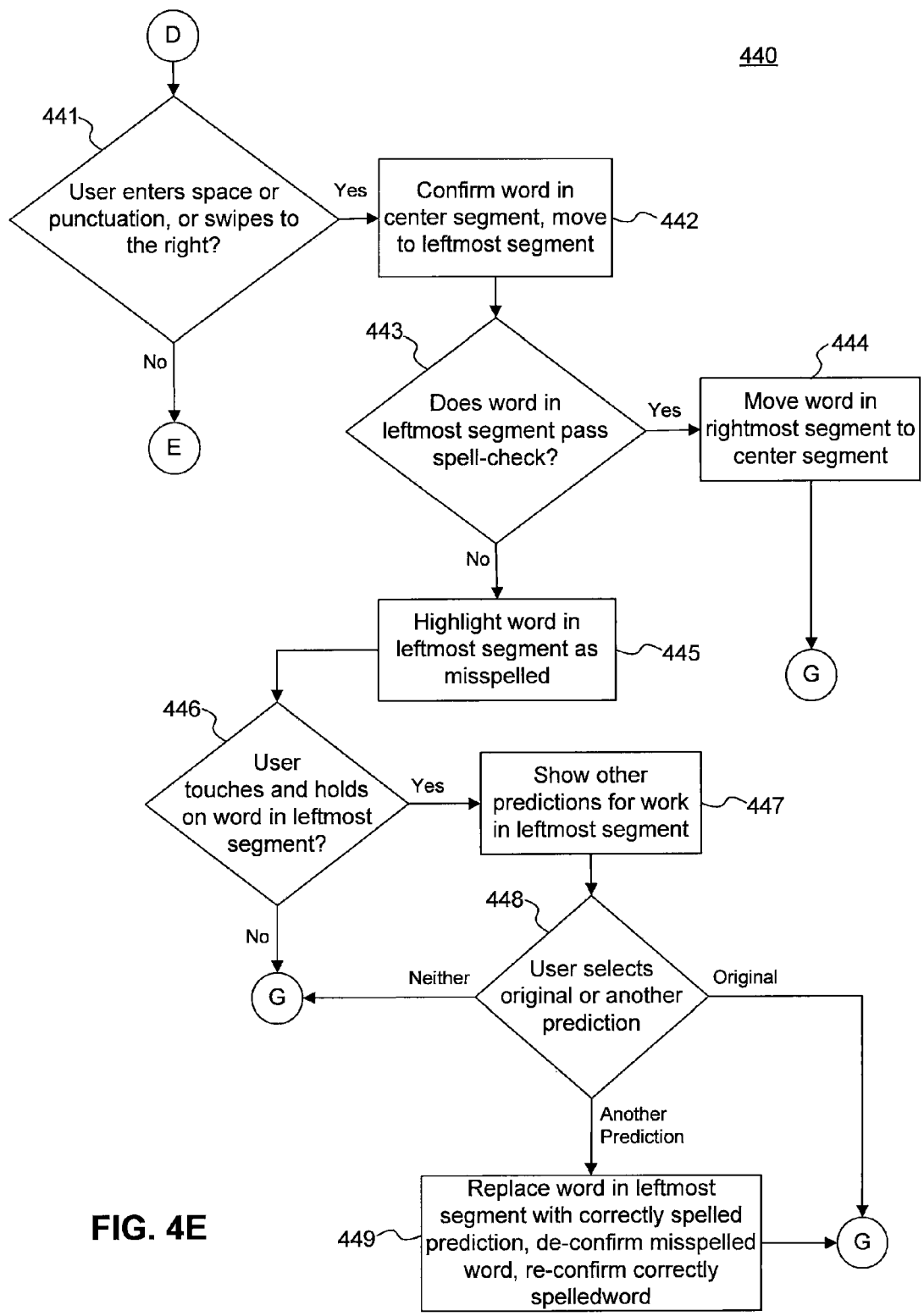
FIG. 4E is a flowchart illustrating an example portion of a method, consistent with embodiments disclosed herein.

If, however, the user has not touched and held on the center segment or on the rightmost segment, or has touched and held down on the rightmost segment but did not select a prediction, processor 102 can continue in FIG. 4E at method 440. This example method enables processor 102 to determine whether the user's entry in the center segment is spelled correctly. In block 441, processor 102 can determine whether the user has provided input indicating the end of a word, by, for example, entering a "space" (by pressing the spacebar), a carriage return (by pressing the Enter key), punctuation signifying the end of a word (for example but not limited to: a comma, a period, a hyphen, an "at" sign (@), an exclamation point or mark, a semicolon), or has swiped across the screen to the right. If processor 102 determines that the user has not performed one of these actions, processor 102 can move forward to block 401 in FIG. 4A.

If processor 102 determines that the user has performed one of these actions signifying the end of entering a word, the process continues in block 442. In block 442, processor 102 confirms the word in the center segment and moves it to the leftmost segment. Processor 102 can then continue to block 443 where processor 102 can determine whether the just-confirmed word in the leftmost segment is spelled correctly. This determination can be made using, for example, a dictionary, a list of past words entered by the user, a list of custom words entered by the user, or an autocompletion algorithm. If processor 102 determines that the word is in fact spelled correctly, processor 102 can continue to block 444, where the prediction in the rightmost segment is moved to the center segment. Processor 102 can then continue to block 401 in FIG. 4A, in order to generate and rank new predictions for the center and rightmost segments.

If, however, processor 102 determines that the word in the leftmost segment is not spelled correctly, processor 102 can then move to block 445 where the word in the leftmost segment is highlighted in order to signify that the word is misspelled. For example, this highlighting can be made using coloring of the text, coloring of the segment containing the text, or the like. Processor 102 then can proceed to block 446.

In block 446, processor 102 determines if the user has touched and held on the leftmost segment. If the user has not touched and held on the leftmost segment, and either begins typing again or taps the misspelled word, processor 102 can proceed back to block 401 in FIG. 4A to continue processing using the misspelled word as part of the words that have been entered and are used to generate and rank new predictions, as described above ad in FIG. 4A.

If, however, the user has touched and held down on the leftmost segment, processor 102 can take a number of steps to assist the user in selecting a word with which to replace the misspelled word. First, processor 102 can show, above the leftmost segment, a number of the predictions that have been generated and ranked for the leftmost segment, block 447. These predictions can be based on an autocompletion algorithm. In some embodiments, the letters that make up the misspelled word are used by an autocorrect algorithm to determine what the user wanted to type based on letter proximity on the keyboard or on past misspellings. In some embodiments, the number of predictions listed will be limited to a specific upper bound, for example, three. However, in some embodiments, the number of predictions displayed to the user above the leftmost segment will only be limited by the number of predictions generated for the center segment.

The user then selects a word, block 448. If the user chooses to not select a word and instead begins typing again, processor 102 can proceed back to block 401 in FIG. 4A to continue processing using the misspelled word as part of the words that have been entered and are used to generate and rank new predictions. Similarly, if the user selects the original misspelled word, processor 102 can proceed back to block 401 in FIG. 4A to continue processing using the misspelled word as part of the words that have been entered and are used to generate and rank new predictions.

If, however, the user selects a properly-spelled prediction—for example, one from a list of predictions displayed above the leftmost segment—then processor 102 can replace the word in the leftmost segment with the properly spelled prediction, block 449, de-confirm the misspelled prediction which has been replaced, and confirm the correctly spelled word.

After this step, processor 102 thus continues to block 401 in FIG. 4A, in order to generate and rank predictions for the word in the center segment before generating and ranking predictions for the word in the rightmost segment as in block 402 of FIG. 4A.

Figure 5A:
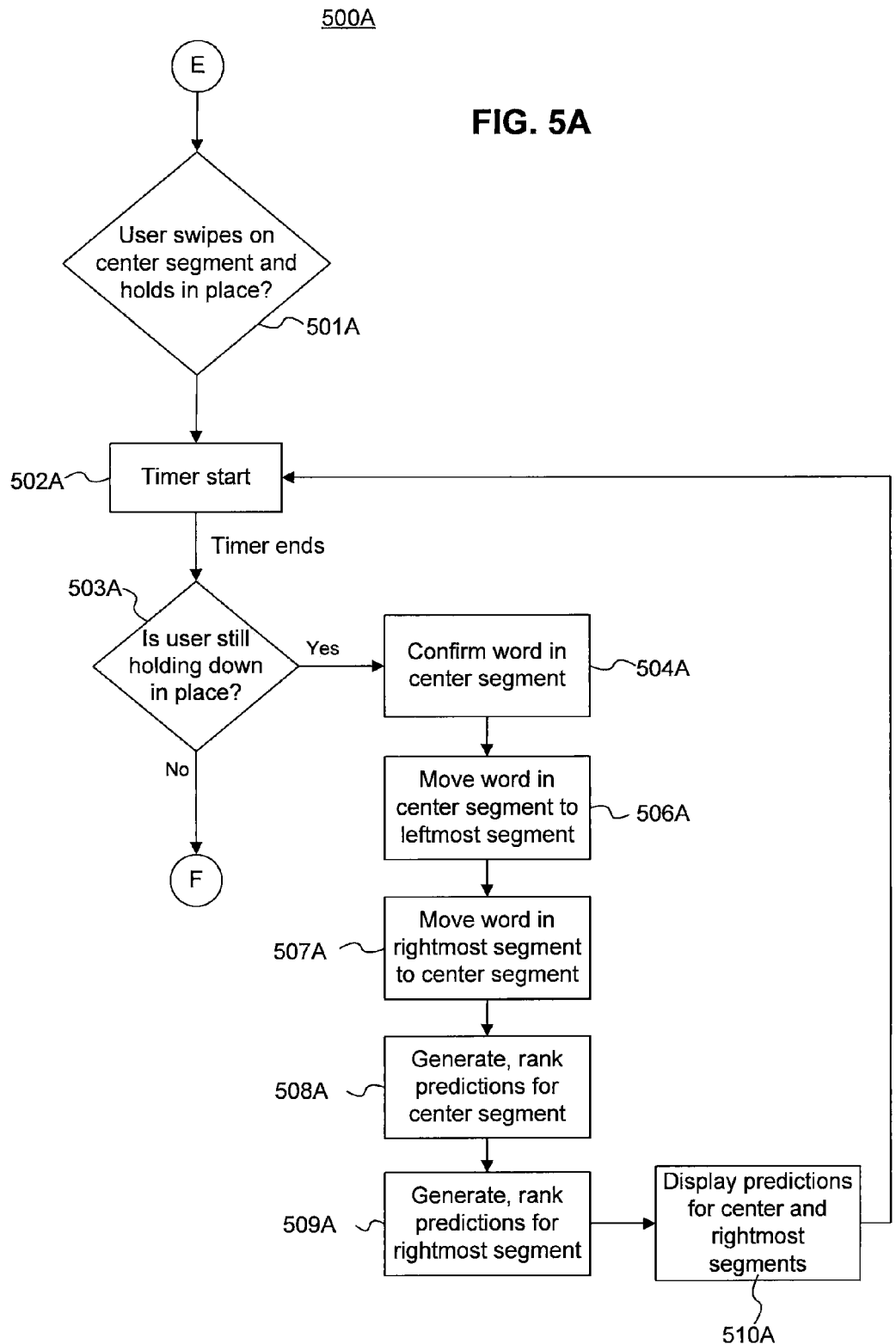
FIG. 5A is a flowchart illustrating an example portion of a method, consistent with embodiments disclosed herein.
Figure 5B:
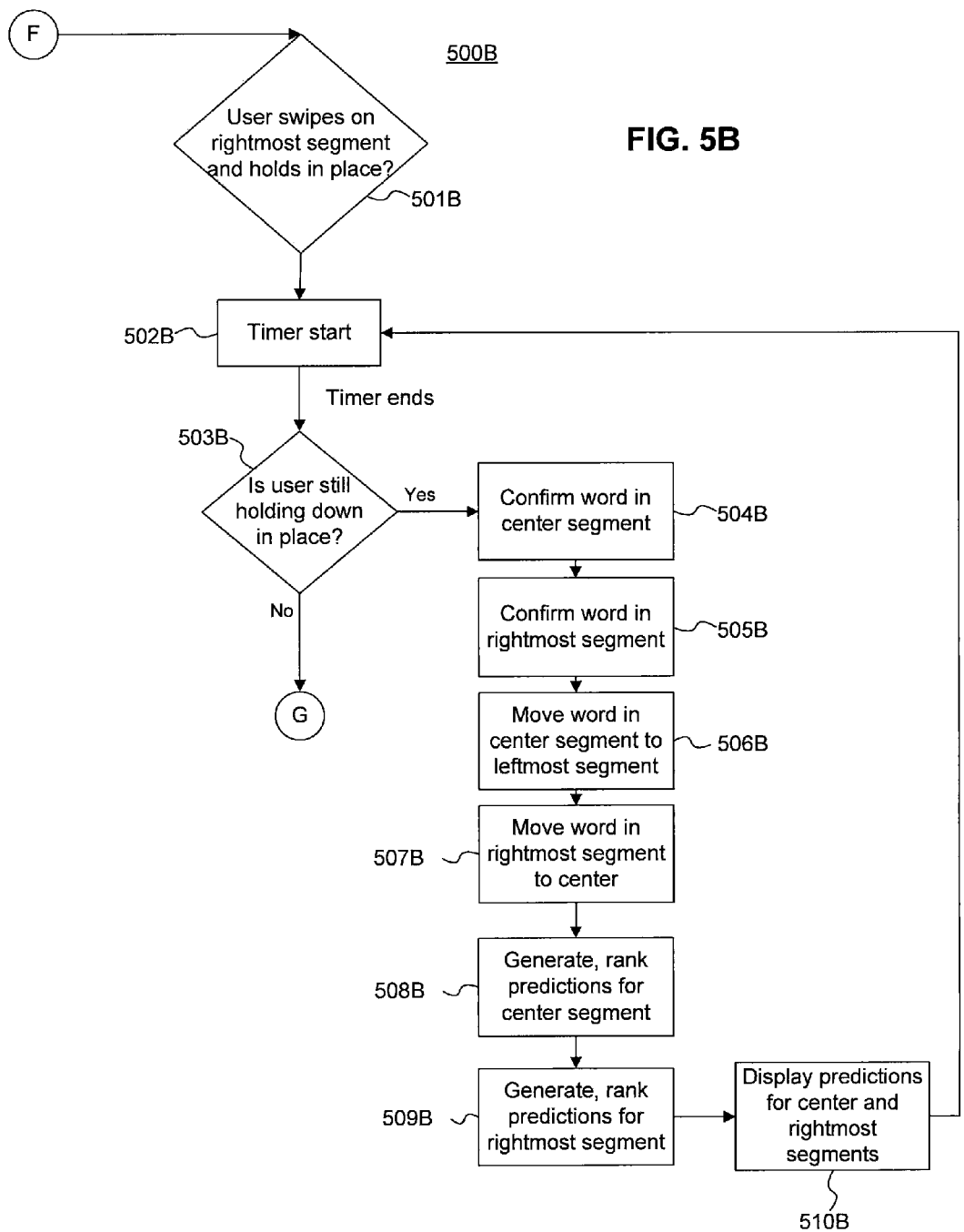
FIG. 5B is a flowchart illustrating an example portion of a method, consistent with embodiments disclosed herein.

FIGS. 5A and 5B disclose a flowchart of embodiments of the touchscreen which enable a user to swipe to confirm words that are predicted for the user, as described in part above.

FIG. 5A discloses a flowchart implementing an action to confirm a successful prediction, when the user touches down on the center segment, swipes across the touchscreen, and holds down in place, as in block 501A. Processor 102 can then start a timer, block 502A. The timer is implemented, for example, to test a condition every 1,000 milliseconds. The timer is used to meter the confirming of words, so that the system will not confirm too many words in too short of a time. In some embodiments, the period defined by the timer is directly proportional to the distance between where the user is holding down on the touchscreen and the edge of the device. Thus, when the user is holding down at a point very close to the edge of the device, the period will be short; conversely, when the user is holding down at a point not as close to the edge of the device, the period will be longer. The relation between the period length, and the distance between the touchscreen and point of contact, can be in a linear relationship (i.e. the period length decreases at an even rate as the point of contact gets closer to the edge), an exponential relationship (i.e. the period length decreases exponentially as the point of contact gets closer to the edge), a logarithmic relationship (i.e. the period length decreases at a logarithmic rate as the point of contact gets closer to the edge), or any other similar relationship.

When the period expires, processor 102 continues to block 503A and determines whether the user is still holding down on the screen. If not, processor 102 can then continue forward to block 501B in FIG. 5B for further processing.

If, however, the user is still holding down on the screen, processor 102 can then continue to block 504A, where processor 102 will confirm the word in the center segment. Processor 102 can then continue to block 506A, where the word in the center segment is moved to the leftmost segment. Processor 102 can then continue to block 507A, where the word in the rightmost segment can be moved to the center segment. In some embodiments, this word is not confirmed upon moving to the center segment; the user's motion is taken to indicate that he wishes to only confirm the word originally in the center segment. However, in some embodiments, the word newly moved to the center segment can be confirmed as well.

After the processing in block 507A, new predictions are generated and ranked for the word in the center segment in block 508A. This generation and ranking is, in some embodiments, performed in substantially the same manner as in block 401 in FIG. 4A. Next, processor 102 proceeds to block 509A, in order to generate and rank new predictions for the word in the rightmost segment. This generation and ranking, in some embodiments, is performed substantially the same manner as in block 402 in FIG. 4B. Processor 102 can then proceed to block 510A, where the most likely predictions for the words in the center segment and the rightmost segment are displayed in their respective segments. Finally, processor 102 can then proceed to block 502A to begin the timer again.

FIG. 5B discloses a flowchart for use when the user touches down on the rightmost segment, swipes across the touchscreen, and holds down in place, block 501B. Processor 102 can then start a timer, block 502B, the operation of the timer as described above with regard to FIG. 5A.

When the period of the timer expires, processor 102 continues to block 503B and determines whether the user is still holding down on the screen. If not, processor 102 can then continue back to block 401 in FIG. 4A for re-generation and ranking of predictions.

If, however, the user is still holding down on the screen, processor 102 can then continue to block 504B, where processor 102 will confirm the word in the center segment. Processor 102 in this embodiment can then continue to block 505B, where processor 102 will confirm the word in the rightmost segment as well. Processor 102 can then continue to block 506B, where the word in the center segment is moved to the leftmost segment. Processor 102 can then continue to block 507B, where the word in the rightmost segment can be moved to the center segment.

After the processing in block 507B, new predictions are generated and ranked for the word in the center segment in block 508B. This generation and ranking is, in some embodiments, performed in substantially the same manner as in block 401 in FIG. 4A. Next, processor 102 proceeds to block 509B, in order to generate and rank new predictions for the word in the rightmost segment. This generation and ranking, in some embodiments, is performed substantially the same manner as in block 402 in FIG. 4B. Processor 102 can then proceed to block 510B, where the most likely predictions for the words in the center segment and the rightmost segment are displayed in their respective segments. Finally, processor 102 can then proceed to block 502B to begin the timer again.

Use of the indefinite article "a" or "an" in the specification and the claims is meant to include one or more than one of the feature that it introduces, unless otherwise indicated.

Other embodiments will be apparent to those skilled in the art from consideration of the specification and practice disclosed herein. It is intended that the specification and examples be considered as examples only, with a true scope and spirit being indicated by the following claims.

What is claimed is:

1. A method for accepting text input on an electronic device, comprising:
   displaying a first input string based on an input selection in a first field,
   displaying a first candidate prediction formed by (1) a set of characters corresponding to input selections and (2) a proposed completion to follow the set of characters in a second field, wherein the proposed completion is generated by a predictive algorithm using at least one of the first input string or the set of characters corresponding to input selections,
   subsequent to the first candidate prediction, generating a second candidate prediction using a predictive algorithm that predicts subsequent candidates based on the first candidate prediction, and
   displaying the second candidate prediction in a third field.

2. The method of claim 1, further comprising:
   generating, by the predictive algorithm, multiple first and second candidate predictions; and
   ranking the multiple first and second candidate predictions based on a plurality of ranking criteria;

wherein displaying the first candidate prediction and second candidate prediction is based at least in part on the plurality of ranking criteria.

3. The method of claim 1, further comprising:
receiving input selecting one of the first candidate prediction or the second candidate prediction.

4. The method of claim 3, further comprising:
responsive to input selecting the first candidate prediction,
displaying the first candidate prediction in the first field,
displaying the second candidate prediction in the second field, and
generating, by the predictive algorithm, multiple candidate predictions for the third field; and
responsive to input selecting the second candidate prediction,
displaying the second candidate prediction in the first field,
generating, by the predictive algorithm, multiple candidate predictions for each of the second and third fields.

5. The method of claim 3, wherein the input selecting one of the first candidate prediction or the second candidate prediction comprises one of a tap on the accepted prediction, a swipe across the accepted prediction, or the input of a punctuation key.

6. The method of claim 5, further comprising:
responsive to input selecting the first candidate prediction,
performing a spell-check on the first candidate prediction; and
if the spell-check determines that the first candidate prediction is misspelled,
displaying alternate predictions for the first candidate prediction, and
receiving input selecting an alternate prediction in place of the first candidate prediction.

7. The method of claim 1, further comprising:
displaying additional predictions for a prediction or an input string in an area vertically aligned with the prediction or input string, respectively.

8. The method of claim 1, wherein:
the set of fields comprises a horizontal bar; and
the first, second, and third fields respectfully comprise left, center, and right segments of the horizontal bar.

9. An electronic device comprising:
a display, and
a processor configured to:
display a first input string based on an input selection in a first field,
display a first candidate prediction formed by (1) a set of characters corresponding to input selections and (2) a proposed completion to follow the set of characters in a second field, wherein the proposed completion is generated by a predictive algorithm using at least one of the first input string or the set of characters corresponding to input selections,
subsequent to the first candidate prediction, generat a second candidate prediction using a predictive algorithm that predicts subsequent candidates based on the first candidate prediction, and
display the second candidate prediction in a third field.

10. The device of claim 9, wherein the processor is further configured to:
generate, by the predictive algorithm, multiple first and second candidate predictions;
rank the multiple first and second candidate predictions based on a plurality of ranking criteria; and
display the first candidate prediction and second candidate prediction based at least in part on the plurality of ranking criteria.

11. The device of claim 9, wherein processor is further configured to receive input selecting one of the first candidate prediction or the second candidate prediction.

12. The device of claim 11, wherein the processor is further configured to:
responsive to input selecting the first candidate prediction,
display the first candidate prediction in the first field,
display the second candidate prediction in the second field, and
generate, by the predictive algorithm, multiple candidate predictions for the third field; and
responsive to input selecting the second candidate prediction,
display the second candidate prediction in the first field,
generate, by the predictive algorithm, multiple candidate predictions for each of the second and third fields.

13. The device of claim 11, wherein the input selecting one of the first candidate prediction or the second candidate prediction comprises one of a tap on the accepted prediction, a swipe across the accepted prediction, or the input of a punctuation key.

14. The device of claim 13, wherein the processor is further configured to:
responsive to input selecting the first candidate prediction,
perform a spell-check on the first candidate prediction; and
if the spell-check determines that the first candidate prediction is misspelled,
display alternate predictions for the first candidate prediction, and
receive input selecting an alternate prediction in place of the first candidate prediction.

15. The device of claim 9, wherein the processor is further configured to:
display additional predictions for a prediction or an input string in an area vertically aligned with the prediction or input string, respectively.

16. The device of claim 9, wherein
the set of fields comprises a horizontal bar; and
the first, second, and third fields respectfully comprise left, center, and right segments of the horizontal bar.

17. A method for accepting text input on an electronic device, comprising:
displaying a preliminary input area on a display, the preliminary input area comprising first, second, and third regions;
displaying a text box on the display;
receiving character entries via a keyboard;
displaying the character entries in the first region and the text box;
generating candidate predictions for a first text unit based on the character entries;
ranking the candidate predictions for the first text unit, based on a first plurality of criteria;
displaying, in the first region, one of the candidate predictions of the first text unit as an initial prediction of the first text unit, based on the rankings of the candidate predictions for the first text unit;
generating first predictions for the second text unit based on the candidate predictions for the first text unit, wherein first predictions for the second text unit are generated by a predictive algorithm that predicts subsequent text units based on preceding text units;

ranking the first predictions for the second text unit based on a second plurality of criteria;

displaying, in the second region, one of the first predictions of the second text unit, based on the rankings of the first predictions for the second text unit;

receiving user input to accept the initial prediction of the first text unit displayed in the first region;

displaying the accepted initial prediction in the third region;

displaying, in the first region, the prediction displayed in the second region, as the current prediction of the first text unit;

generating second predictions for the second text unit based on the current prediction of the first text unit;

ranking the second predictions for the second text unit based on a third plurality of criteria;

displaying, in the second region, one of the second predictions of the second text unit, based on the rankings of the second predictions for the second text unit; and displaying the accepted initial prediction in the text box.

18. The method of claim 17, wherein the candidate predictions for the first text unit are based on the character entries and candidate predictions that have been previously accepted.

19. The method of claim 17, further comprising:

displaying additional candidate predictions for the first text unit in an area vertically aligned with the displayed one of the candidate predictions for the first text unit.

20. The method of claim 17, wherein the user input to accept the initial prediction of the first text unit displayed in the first region comprises one of a tap on the initial prediction, a swipe across the initial prediction, or a punctuation key being pressed.

21. The method of claim 20, further comprising:

upon receiving the user input to accept the initial prediction of the first text unit displayed in the first region, performing a spell-check on the initial prediction; and if the spell-check determines that the initial prediction of the first text unit displayed in the first region is misspelled:
   displaying alternate predictions for the initial prediction of the first text unit displayed in the first region; and
   receiving user input to accept an alternate prediction of the first text unit displayed in the first region.

22. The method of claim 17, wherein:

the remaining input area comprises a horizontal bar; and the first, second, and third regions respectfully comprise center, right, and left segments of the horizontal bar.

23. An electronic device comprising:

a display, and a processor configured to:
   display a preliminary input area on the display, the preliminary input area comprising first, second, and third regions;
   display a text box on the display;
   receive character entries via a keyboard;
   display the character entries in the first region and the text box;
   generate candidate predictions for a first text unit based on the character entries;
   rank the candidate predictions for the first text unit, based on a first plurality of criteria;
   display, in the first region, one of the candidate predictions of the first text unit as an initial prediction of the first text unit, based on the rankings of the candidate predictions for the first text unit;
   generate first predictions for the second text unit based on the candidate predictions for the first text unit, wherein first predictions for the second text unit are generated by a predictive algorithm that predicts subsequent text units based on preceding text units;
   rank the first predictions for the second text unit based on a second plurality of criteria;
   display, in the second region, one of the first predictions of the second text unit, based on the rankings of the first predictions for the second text unit;
   receive user input to accept the initial prediction of the first text unit displayed in the first region;
   display the accepted initial prediction in the third region;
   display, in the first region, the prediction displayed in the second region, as the current prediction of the first text unit;
   generate second predictions for the second text unit based on the current prediction of the first text unit;
   rank the second predictions for the second text unit based on a third plurality of criteria;
   display, in the second region, one of the second predictions of the second text unit, based on the rankings of the second predictions for the second text unit; and
   display the accepted initial prediction in the text box.

24. The device of claim 23, wherein the candidate predictions for the first text unit are based on the character entries and candidate predictions that have been previously accepted.

25. The device of claim 23, wherein the processor is further configured to:

display additional predictions for the first text unit in an area vertically aligned with the displayed one of the candidate predictions for the first text unit.

26. The device of claim 23, wherein the user input to accept the initial prediction of the first text unit displayed in the first region comprises one of a tap on the initial prediction, a swipe across the initial prediction, or a punctuation key being pressed.

27. The device of claim 26, wherein the processor is further configured to:

receive the user input to accept the initial prediction of the first text unit displayed in the first region; and perform a spell-check on the initial prediction;

if the spell-check determines that the initial prediction of the first text unit displayed in the first region is misspelled:
   display alternate predictions for the initial prediction of the first text unit displayed in the first region; and
   receive user input to accept an alternate prediction of the first text unit displayed in the first region.

28. The method of claim 23, wherein:

the remaining input area comprises a horizontal bar; and the first, second, and third regions respectfully comprise center, right, and left segments of the horizontal bar.

* * * * *

UNITED STATES PATENT AND TRADEMARK OFFICE
CERTIFICATE OF CORRECTION

| | | |
|---|---|---|
| PATENT NO. | : 9,223,497 B2 | Page 1 of 1 |
| APPLICATION NO. | : 13/422197 | |
| DATED | : December 29, 2015 | |
| INVENTOR(S) | : Jerome Pasquero, Donald Somerset McCulloch Mckenzie and Jason Tyler Griffin | |

It is certified that error appears in the above-identified patent and that said Letters Patent is hereby corrected as shown below:

Column 15, Line 57, In Claim 9, delete "generat" and insert -- generate --, therefor.

Column 18, Line 55, In Claim 28, delete "method" and insert -- device --, therefor.

Signed and Sealed this
Twelfth Day of July, 2016

Michelle K. Lee
*Director of the United States Patent and Trademark Office*